United States Patent [19]

Ferris et al.

[11] Patent Number: 4,688,993

[45] Date of Patent: Aug. 25, 1987

[54] TANGENTIAL LINK SWASHPLATE CENTERING MEMBER

[75] Inventors: Donald L. Ferris, Newton; Johnny P. Gendreau, Meriden; Alexander Korzun, Bridgeport, all of Conn.

[73] Assignee: United Technologies Corporation, Hartford, Conn.

[21] Appl. No.: 714,590

[22] Filed: Mar. 21, 1985

[51] Int. Cl.$^4$ .............................................. B64C 27/00
[52] U.S. Cl. .......................................... 416/114; 74/60
[58] Field of Search ..................... 416/114, 115; 74/60

[56] References Cited

U.S. PATENT DOCUMENTS

| 2,689,616 | 9/1954 | Nagler | 416/114 |
| 2,720,271 | 10/1955 | Alex | 416/114 |
| 3,144,908 | 8/1964 | Pascher | 416/114 |
| 3,589,831 | 6/1971 | Lemnios et al. | 416/114 |
| 3,799,695 | 3/1974 | Yamakawa | 416/114 |
| 4,477,224 | 10/1984 | Watson | 416/114 |

FOREIGN PATENT DOCUMENTS 2122157A 1/1984 United Kingdom .

Primary Examiner—Robert E. Garrett
Assistant Examiner—John Kwon
Attorney, Agent, or Firm—Gerald E. Linden

[57] ABSTRACT

Links (48-50) tangential to the rotorshaft (30) and connected to the inner swashplate ring (38) center the swashplate and restrain it from rotating (in the case of a stationary inner ring) by attachment to gearbox lugs (34-36), or drive it in unison with the rotorshaft (in the case of a rotating inner ring) by attachment to rotorshaft flanges. Spherical (rod-end) bearings (52-54, 56-58) so that the links can accommodate collective and cyclic swashplate attitude changes by moving out of plane.

Links (70-72) tangential to the outer swashplate ring (64) and connected thereto and to the airframe (74) perform a similar function in restraining, centering and allowing for collective/cyclic movement of a stationary outer swashplate ring.

4 Claims, 3 Drawing Figures

FIG. 1
PRIOR ART
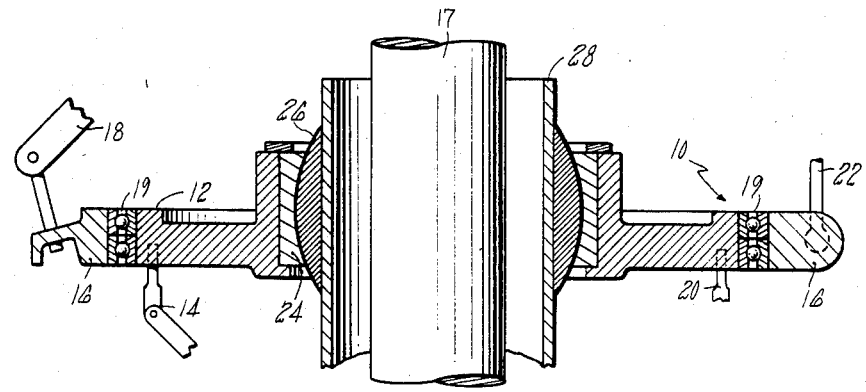
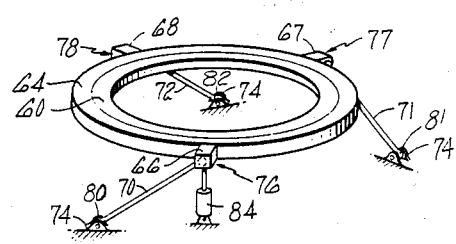
FIG. 3

TANGENTIAL LINK SWASHPLATE CENTERING MEMBER

BACKGROUND OF THE INVENTION

Blade pitch control in a helicopter main rotor is typically achieved by a swashplate having a stationary and a rotating ring with a bearing therebetween. The rotating ring is coupled to pitch horns on the rotor blades. The stationary ring is coupled to actuators that respond to pilot or automatic flight system inputs. Collective control is achieved by translating the swashplate up and down with respect to the rotorshaft and cyclic control is achieved by tilting the swashplate relative to the rotorshaft.

Existing designs consist of a centering spherical ball with a cylinderical inner diameter which slides up and down the rotorshaft when the inner swashplate member is rotating with the rotor, or up and down a stationary stand pipe mounted to the gearbox when the inner swashplate member is stationary with respect to rotation of the rotor. The translation (up and down sliding) of the centering ball allows for collective motion of the swashplate. The centering ball also allows the swashplate to tilt, which accounts for cyclic motion of the swashplate. Scissor links are connected between a swashplate member and the rotor to drive the swashplate member when it is part of the rotating system, or between the swashplate member and an airframe member to restrain the swashplate member from rotating when it is part of the stationary system.

Copending, commonly-owned U.S. patent application Ser. No. 644,000, entitled FLEXIBLE SWASHPLATE CENTERING MEMBER, discloses a flexible swashplate centering member having generally radial flexible spokes. The radial spokes disclosed therein require cylindrical bearings at their outer ends to allow for collective translation of the swashplate, and shear pads at the outer ends to allow for the spoke lengthening that also accompanies collective swashplate translation from a mid-collective position.

DISCLOSURE OF THE INVENTION

It is an object of this invention to provide for centering a swashplate member without a ball joint, stand pipe, and scissors linkage, thereby reducing cost, weight, complexity and the clearance between the swashplate and the gearbox.

According to the invention, an inner swashplate ring is centered and supported about the rotorshaft by a swashplate centering member. The centering member consists of three equally-spaced, equal-length links, generally tangential to the rotorshaft, and joining the swashplate inner member to the rotorshaft (in the case of a rotating inner member) or to the gearbox (in the case of a stationary inner member). The tangential links are mounted in a plane perpendicular to the rotorshaft when the swashplate is positioned at a mid-collective, no-cyclic attitude, and allow up and down translation of the swashplate for collective input and tilt capability of the swashplate for cyclic inputs.

The links have spherical rod end bearings at each end which may be of elastomer laminated construction.

In an alternate embodiment of the invention, for centering and restraining the outer swashplate member, links tangential to the outer member and connected between the outer member and the airframe are employed.

Other objects, features and advantages will become apparent in light of the following description thereof.

BRIEF DESCRIPTION OF THE DRAWINGS

FIG. 1 is a side view of a prior art swashplate arrangement;

FIG. 3 is a perspective view of the swash plate centering member of this member of this invention, for centering an outer swash plate ring.

BEST MODE FOR CARRYING OUT THE INVENTION

Figure 2:
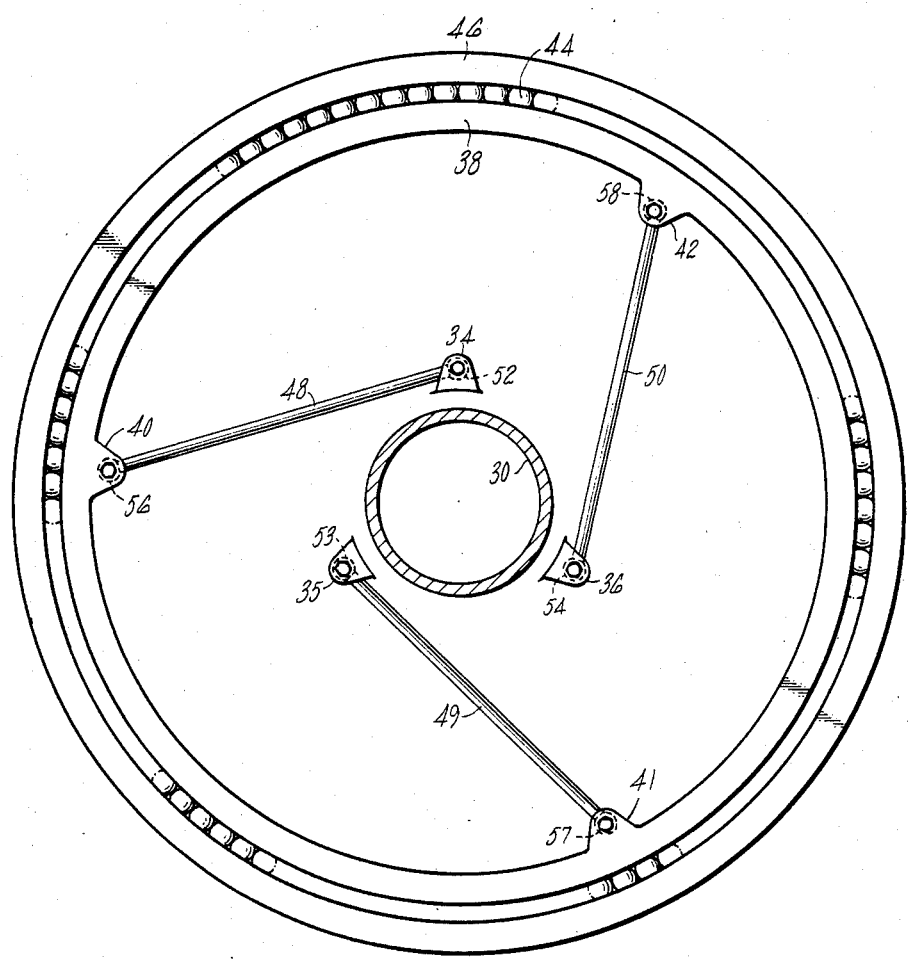
FIG. 2 is a top view of the swashplate centering member of this invention, for centering an inner swashplate ring.

An embodiment of the invention is discussed for the case of centering an inner swashplate member.

In the prior art, as shown in FIG. 1, a swashplate 10 has an inner ring 12 held stationary by a scissors link 14, and an outer ring 16 that is rotated with a rotorshaft 17 by a scissors link 18. The outer ring 16 is journaled to the inner ring 12 via bearings 19. The inner ring 12 is responsive via linkages and actuators 20 to pilot or automatic control inputs. The outer ring 16 is connected via linkages 22 to individual blade pitch horns to move those aerodynamic surfaces in response to the control inputs.

The inner ring 12 is attached at its inner periphery to the socket 24 of a ball joint 26 that is free to slide on a stand pipe 28 that encircles the rotorshaft 17. This enables the swashplate 10 to translate up and down and to tilt with respect to the rotorshaft 17 for collective and cyclic control, respectively, while remaining centered thereabout.

With the present invention, there is no need for the stationary scissors 14, the ball joint 26 or the stand pipe 28.

FIG. 2 shows the tangential-link swashplate centering member of this invention. A rotorshaft 30 is encircled by three lugs 34–36 equally spaced (120 degrees) about its outer circumference. The lugs 34–36 are "airframe stationary", such as gearbox lugs. An inner swashplate ring 38 also has three lugs 40–42 equally spaced about its inner circumference. A bearing 44 joins an outer swashplate ring 46 to the inner ring 38.

Three equal length links 48–50 are each attached at their inner end, via spherical (rod-end type) bearings 52–54, to the lugs 34–36 and are attached, via spherical (rod-end type) bearings 56–58, at their outer end to the lugs 40–42. The links are generally tangential to the rotorshaft. Obviously, the closer the lugs are to the rotorshaft, the more truly tangential the links are. The links restrain rotation of the inner swashplate member in either tension or compression (depending upon direction of rotation), and are nominally in-plane with the swashplate for a no-cyclic, mid-collective attitude. The spherical bearings 52–54, 56–58 allow for swashplate tilt and translation. (For the case of a rotating inner swashplate ring, the inner ends of the links would be attached to suitable lugs on the rotorshaft itself).

When the swashplate is moved collectively in a plane parallel to the rotor plane from its mid-collective position, a small circumferential motion of the inner swashplate results from the links 48–50 rotating out of the plane parallel to the rotor plane. As collective is increased, the circumferential motion increases. This circumferential motion of the inner swashplate will result in a vertical servo change in length for an inner stationary swashplate, or in a vertical control rod change in length for an inner rotating swashplate. The change is minimal in the range of 0.000 to 0.005 inches. The swashplate still remains centered about the rotorshaft since all the links are of equal length and equally spaced about the swashplate.

In the case of a stationary inner swashplate member, when cyclic tilt is introduced, the center of the swashplate remains coincident with the center of the rotorshaft at the mid point only. When a combination of collective and cyclic is introduced, the center of the swashplate departs from the rotorshaft center by a small amount in the range of 0.001 to 0.022 inches. This lateral displacement of the inner swashplate member remains fixed until cyclic tilt is changed. The resultant change and length to a vertical servo becomes a combination of circumferential motion as well as lateral displacement of the inner swashplate member. The composite change again is minimal, in the range of 0.0000 to 0.0005 inches. The circumferential motion due to cyclic change may be on the order of 15 minutes of angular motion and can be tolerated by either the actuation servos or control rods.

It should be noted that the longer the length of the links and the longer the length of the servos and the minimizing of the collective cyclic range of the swashplate, the change in length of the servos will decrease accordingly.

The three links remain fixed in a particular orientation to the inner swashplate member until another collective or cyclic change is made.

In the case of a rotating inner swashplate member, when cyclic tilt is introduced the center of the swashplate remains coincident with the rotorshaft at the mid-pitch point only. When a combination of collective and cyclic is introduced, the center of the swashplate deviates from the rotorshaft center by a small amount. The lateral displacement of the inner swashplate member increases as the combination of collective/cyclic input increases. This lateral displacement of the inner swashplate member continually changes as the rotorshaft rotates about its center, and the connecting links continually change their plane due to the cyclic tilt of the inner member of the swashplate. The center of the swashplate describes an elliptical path as the driving rotorshaft revolves 360°. This ellipse varies from a major axis to a minor axis and is only about 0.004 inches. The resultant change in length to a vertical control rod becomes a combination of circumferential motion as well as lateral displacement—continually changing during one revolution of the inner swashplate member. This change to a vertical control rod is minimum in the range of 0.0000 to 0.0030 inches. The displaced center of the inner swashplate member due to cyclic is not displaced in the direction of swashplate tilt, but is off by approximately 20° to it.

FIG. 3 shows a centering member for a stationary outer swashplate ring 64 (60 is the inner ring). Three lugs 66–68 are evenly distributed about the outer ring 64. Three equal length links 70–72 are attached at one end, via spherical rod-end bearings 76–78, to the lugs 66–68; and at the other end, via spherical rod-end bearings 80–82, to appropriate lugs 74 on an airframe stationary component such as the gearbox. The lugs 74 are equally spaced about the rotorshaft (not shown). The links 70–72 are generally tangential to the outer ring 64 and may be biased, as shown for a higher collective pitch. Servos 84 may also use the lugs 66–68 for attachment points.

Various changes may be made to the invention without departing from the spirit and scope thereof. For instance, four links could be used instead of three.

We claim:

1. A centering member for centering about a rotorshaft and for allowing to tilt and to translate a swashplate having a stationary inner ring attached to an airframe stationary component and a rotating outer ring attached to the rotorshaft, comprising first lugs (34–36) attached to the airframe stationary component and equally spaced about the rotorshaft;

second lugs (40–42) attached to the inner ring and equally spaced thereabout; and equal-length links (48–50), each attached at one end via spherical bearings (52–54) to the first lugs and at the other end via spherical bearings (56–58) to the second lugs, wherein the links are generally tangential to the rotorshaft for restraining, centering, and allowing for collective and cyclic movement of a swashplate.

2. A centering member according to claim 1 wherein for a no-cyclic, mid-collective attitude of the swashplate, the links are in-plane with the swashplate.

3. A centering member for centering about a rotorshaft and for allowing to tilt and to translate a swashplate having a rotating inner ring attached to the rotorshaft and a stationary outer ring attached to an airframe stationary component, comprising:

first lugs (34–36) attached to the rotorshaft and equally spaced thereabout;

second lugs (40–42) attached to the inner ring and equally spaced thereabout; and equal-length links (48–50), equal-length links (48–50), each attached at one end via spherical bearings (52–54) to the first lugs and at the other end via spherical bearings (56–58) to the second lugs, wherein the links are generally tangential to the rotorshaft for restraining, centering, and allowing for collective and cyclic movement of a swashplate.

4. A centering member for centering about a rotorshaft and for allowing to tilt and to translate a swashplate having a rotating inner ring attached to the rotorshaft and a stationary outer ring attached to an airframe stationary component, comprising:

first lugs (74) attached to the airframe stationary component and equally spaced about the rotorshaft for restraining, centering, and allowing for collective and cyclic movement of a swashplate;

second lugs (66–68) attached to the outer ring and equally spaced thereabout; and equal-length links (70–72), each attached at one end via spherical bearings (80–82) to the first lugs and at the other end via spherical bearings (76–78) to the second lugs, wherein the links are tangential to the outer ring.